United States Patent
Gonzalez Chapa

(10) Patent No.: US 8,313,311 B2
(45) Date of Patent: Nov. 20, 2012

(54) ADJUSTABLE UNLOADER VALVE

(75) Inventor: Gerardo Angel Gonzalez Chapa, Nuevo Leon (MX)

(73) Assignee: Karcher North America, Inc., Englewood, CO (US)

( * ) Notice: Subject to any disclaimer, the term of this patent is extended or adjusted under 35 U.S.C. 154(b) by 767 days.

(21) Appl. No.: 12/479,420

(22) Filed: Jun. 5, 2009

(65) Prior Publication Data

US 2010/0310387 A1    Dec. 9, 2010

(51) Int. Cl.
*F04B 49/03* (2006.01)
*F04B 49/035* (2006.01)

(52) U.S. Cl. ............................ 417/307; 417/311

(58) Field of Classification Search .......... 417/279–311, 417/451–455
See application file for complete search history.

(56) References Cited

U.S. PATENT DOCUMENTS

| | | | |
|---|---|---|---|
| 2,348,238 A | 5/1944 | Beeke et al. |
| 3,834,413 A | 9/1974 | Peterson |
| 4,083,410 A | 4/1978 | Anderson |
| 5,160,174 A | 11/1992 | Thompson |
| 5,396,918 A | 3/1995 | Parker |
| 5,419,365 A | 5/1995 | Jezek |
| 5,975,863 A | 11/1999 | Mazzucato |
| 5,979,788 A | 11/1999 | Rancourt et al. |
| 6,123,367 A | 9/2000 | Miller |
| 6,287,085 B1 | 9/2001 | Goettel et al. |
| 6,464,475 B1 | 10/2002 | Bertolini |
| 6,478,643 B2 | 11/2002 | Jolley |
| 7,281,545 B2 | 10/2007 | Hunt |

OTHER PUBLICATIONS

"VB 75—Unloader Valve (discharging)", P.P.—S.r.l. -Equipaggiamenti Tecnici Del Lavaggio brochure/catalog, Dec. 19, 2007, pp. 1-5.*
Official Action for Canada Patent Application No. 2,674,180, dated Sep. 9, 2011 2 pages.
"Bolt on Unloader Valve MV 5666", Meccanica Veneta website, available at http://www.meccanicaveneta.com/pagine/catalogo/dett.asp?smi=0&pagina=catalog&modello=789, accessed Mar. 23, 2009, p. 1.
"Valvole: Unloader Valves—Regulateurs—Reguladores", Bertolini Pumps brochure/catalog, date unknown, pp. 86-87.
"VB 75—Unloader Valve (discharging)", P.A.—S.r.l.—Equipaggiamenti Tecnici Del Lavaggio brochure/catalog, Dec. 19, 2007, pp. 1-5.

* cited by examiner

*Primary Examiner* — Anh Mai
*Assistant Examiner* — Nathaniel Lee
(74) *Attorney, Agent, or Firm* — Sheridan Ross P.C.

(57) ABSTRACT

A pressure unloader valve is disclosed having inlet and outlet connections adjustable about two dimensions to adapt to a wide variety of high pressure pumps and similar equipment associated with such applications. According to one embodiment, the inlet and outlet connections are adjustable about both a horizontal and a vertical axis. A method for regulating pressure in a valve and pump assembly is also disclosed.

20 Claims, 3 Drawing Sheets

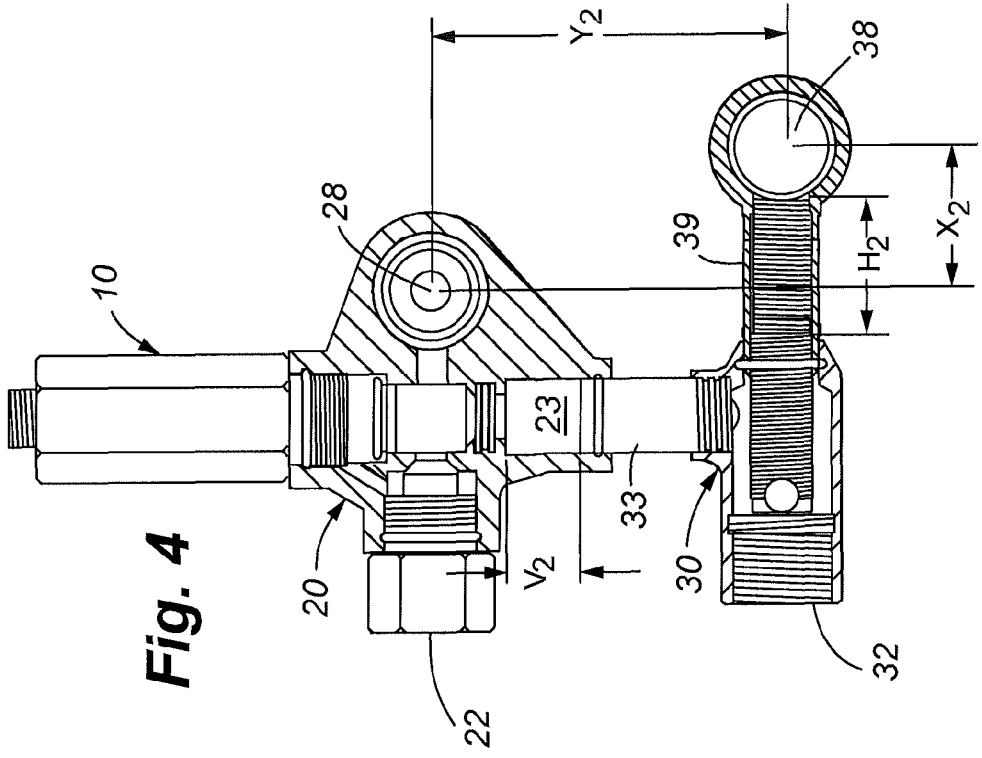
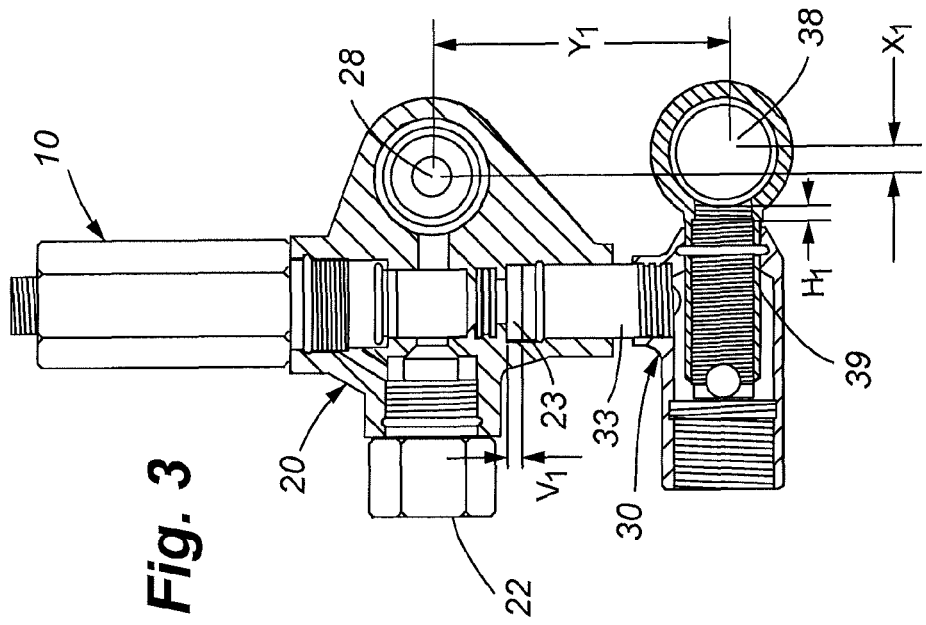

the present disclosure is related to valves and regulators, and more specifically a high pressure unloader valve having inlet and outlet connections adjustable about two dimensions to adapt to a wide variety of high pressure pumps and similar equipment associated with such applications.

ADJUSTABLE UNLOADER VALVE

FIELD OF THE INVENTION

The present disclosure is related to valves and regulators, and more specifically a high pressure unloader valve having inlet and outlet connections adjustable about two dimensions to adapt to a wide variety of high pressure pumps and similar equipment associated with such applications.

BACKGROUND OF THE INVENTION

Unloader valves or "regulators", as they are sometimes referred to, direct the flow of water exiting a pump. In particular, unloader valves are designed to redirect the flow of water from the outlet of the pump, through the unloader valve, and back to the inlet side of the pump to prevent dangerously high pressure from building in the pump, and when activated through a separate outlet or exhaust. Unloader valves are often required for high pressure pumping applications for quickly and efficiently regulating excess pressure created by the high pressure pump. Types of unloader valves include "trapped pressure" valves, which are activated by building pressure within the valve assembly, and "flow actuated" valves, which are activated by a decrease in fluid flow. Examples of when unloader valves or regulators are required may include instances where a high pressure pump is continuously operated, or in instances where the pressure needs to be regulated to avoid damage to the high pressure pump, its component parts, or to the system with which the high pressure pump is associated.

In the past, unloader valves had to be designed for each type of pump for which they were employed. This was true not only for the size of the pump, and the location of the couplings of the unloader valve, but also for the minimum and maximum flow rates allowed by the unloader valve. As a result of their custom nature, such unloader valves known in the prior art are extremely sensitive to adjustment, and also sensitive to the precise sizing and locations of couplings of the unloader valve to the particular pump. This is due at least in part to the relatively high pressures experienced by the unloader valves during operation, and the couplings between the unloader valve and the pump. For a further description of problems associated with unloader valves and regulators known in the art, please refer to U.S. Pat. No. 3,834,413, which is incorporated by reference herein in its entirety. U.S. Pat. Nos. 5,396,918, 5,419,365, and 6,478,643 are also incorporate by reference herein in their entireties.

Prior art unloader valves and related "regulating" devices are limited in the variety and types of pumps and high pressure pumps that they accommodate. More specifically, if the inlet and outlet for the pump are not aligned within the range of locations of the fittings for the particular pumps requiring the unloader valve, the unloader valve will not allow coupling with and therefore will not function with the particular pump. It is common for pumps to have inlet and outlet connections that are spaced both horizontally and vertically apart from one another, and this spacing often differs from one pump to the next. Thus, these prior art unloader valves do not accommodate a wide variety of different sized high pressure pumps and other similar devices, and generally experience other problems associated with prior art unloader valves.

SUMMARY OF THE INVENTION

The unloader valve of the present disclosure solves these and other problems associated with the prior art by providing an unloader valve assembly having inlet and outlet connections or "couplings", capable of connecting with the respective outlets and inlets of a variety of different sized pumps, and where the locations of the couplings of the unloader valve assembly are adjustable about two axes or dimensions to allow the unloader valve to adapt to a wide variety and size of high pressure pumps and/or similar equipment. The unloader valve assembly of the present disclosure accomplishes this in part by incorporating an outlet or first coupling, which is fixed to the unloader valve assembly, and an associated inlet or second coupling, both of which are adjustable about both a first axis and a second axis. This adjustability permits the location of the second coupling to be adjusted or modified with respect to the location of the first coupling. The ability of the second coupling to adjust about a first and second axis (both vertically and horizontally) further permits the unloader valve assembly to be used with a wide variety of sizes and types of pumps, and in particular high pressure pumps.

The unloader valve of the present disclosure also solves other problems associated with prior art valves and regulator. For example, see U.S. Pat. Nos. 6,464,475 and 5,975,863, both of which are incorporated by reference herein in their entireties. In particular, the unloader valve assembly of the present disclosure is adaptable to a wide range of internal pressures and flow rates, and is generally usable with a high number of pump types currently available in the market.

In one particular aspect or embodiment of the present invention, a valve assembly is provided which generally comprises:

an unloader valve, proximate to an upper portion of the valve assembly;

a first coupling, proximate to a central portion of the valve assembly;

a second coupling, proximate to a lower portion of the valve assembly, the second coupling adjustable in location with respect to the first coupling in at least two directions;

at least one outlet for expelling excess fluid from the valve assembly and at least one inlet for aspirating the valve assembly;

wherein the first coupling is designed to be operatively associated with an outlet of the pump and the second coupling is designed to be operatively associated with an inlet or bypass of the pump; and wherein when the unloader valve is inactive, fluid is permitted to communicate between the outlet of the pump to the first coupling of the valve assembly to the second coupling of the valve assembly to the inlet or bypass of the pump, and wherein when the unloader valve is active, fluid is also permitted to communicate between the valve assembly and the at least one outlet for expelling excess fluid from the valve assembly.

According to another embodiment of the present invention, a valve is provided, which generally comprises:

an unloader valve, a first and a second coupling for coupling to said pump, at least one outlet for expelling excess fluid from the valve and at least one inlet for aspirating the valve;

the second coupling being adjustable in relation to the first coupling about both a first axis and a second axis;

wherein the first coupling is designed to be operatively associated with an outlet of the pump and the second coupling is designed to be operatively associated with an inlet or bypass of the pump; and wherein the unloader valve is normally in a closed position, and fluid is permitted to communicate in the valve between the outlet of the pump to the inlet of the pump, and wherein when the pressure in the valve reaches a predetermined level, the unloader valve becomes open and fluid is permitted to communicate between the valve and the at least one outlet for expelling excess fluid from said valve.

These and other features will become apparent after review of the following Detailed Description and accompanying drawing figures and appended claims.

BRIEF DESCRIPTION OF THE DRAWINGS

FIG. 3 is a partial sectional view of the unloader valve of FIG. 1 with the first and second couplings shown in a first position; and FIG. 4 is a partial sectional view of the unloader valve of FIG. 1 with the first and second couplings shown in a second position.

The figures are not necessarily drawn to scale.

DETAILED DESCRIPTION

As described in detail below, various embodiments of the present disclosure include a novel valve, comprising an inlet connection or coupling and an outlet connection or coupling, the outlet coupling further comprising adjustment means, and the valve comprising an unloader valve for regulating the flow of water returning to a pump or similar device, and/or other features.

Figure 1:
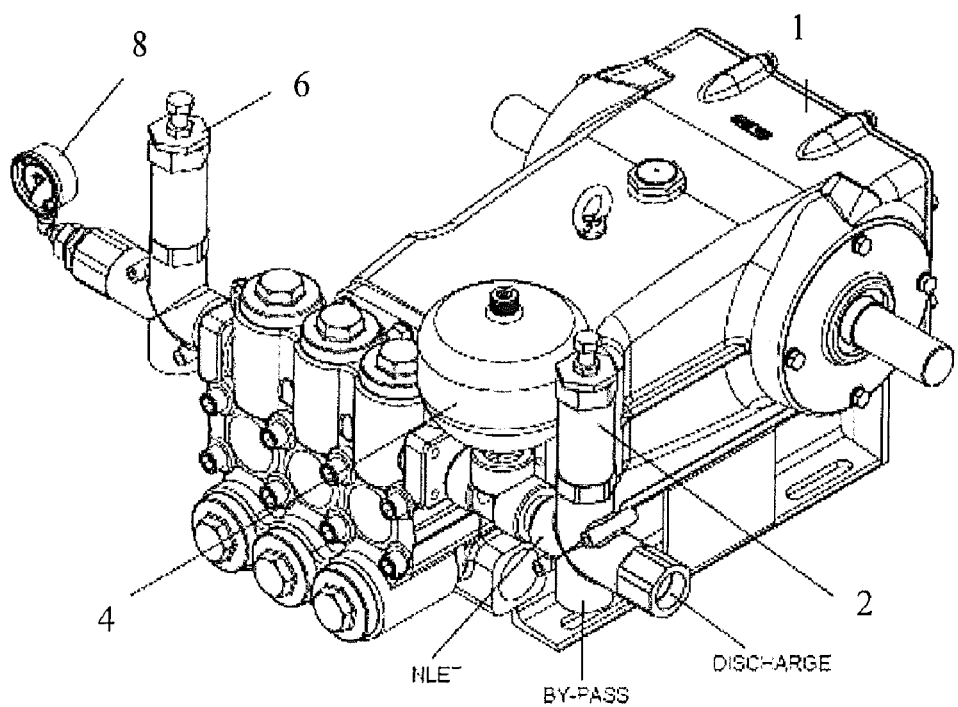
FIG. 1 is a perspective view of a prior art unloader valve and pump assembly.

Referring now to the drawing figures, FIG. 1 shows a prior art unloader valve and pump assembly. This assembly comprises a fluid pump 1, a pressure sensitive unloader valve 2, a pulsation dampener 4, a relief valve 6 and pressure gauge 8. As shown in FIG. 1, the inlet of the prior art unloader valve 2 is coupled to an outlet of the pump 1 and the bypass of the unloader valve remains open or uncoupled. In other prior art embodiments, the bypass may be coupled to an inlet (not shown) of the pump 1. The unloader valve 2 includes a discharge which permits fluid to exit the unloader valve 2 once a sensitive or maximum pressure has been reached inside the unloader valve 2. Although the discharge connection of this prior art unloader valve is shown as being open or uncoupled, in other embodiments the discharge may be connected to a hose or tube or other conduit for taking the discharge fluid to a separate location, or potentially re-circulated back to the pump 1. Thus, in operation the prior art pump and valve assembly shown in FIG. 1, regulate the pressure of water in the pump assembly, and selectively discharge any excess water due to increased pressure within the pump assembly. A pulsation dampener 4 is sometimes provided to reduce spikes in the pressure experienced by the pump assembly, and a relief valve 6 is sometimes provided to accommodate excess pressure as well.

Figure 2:
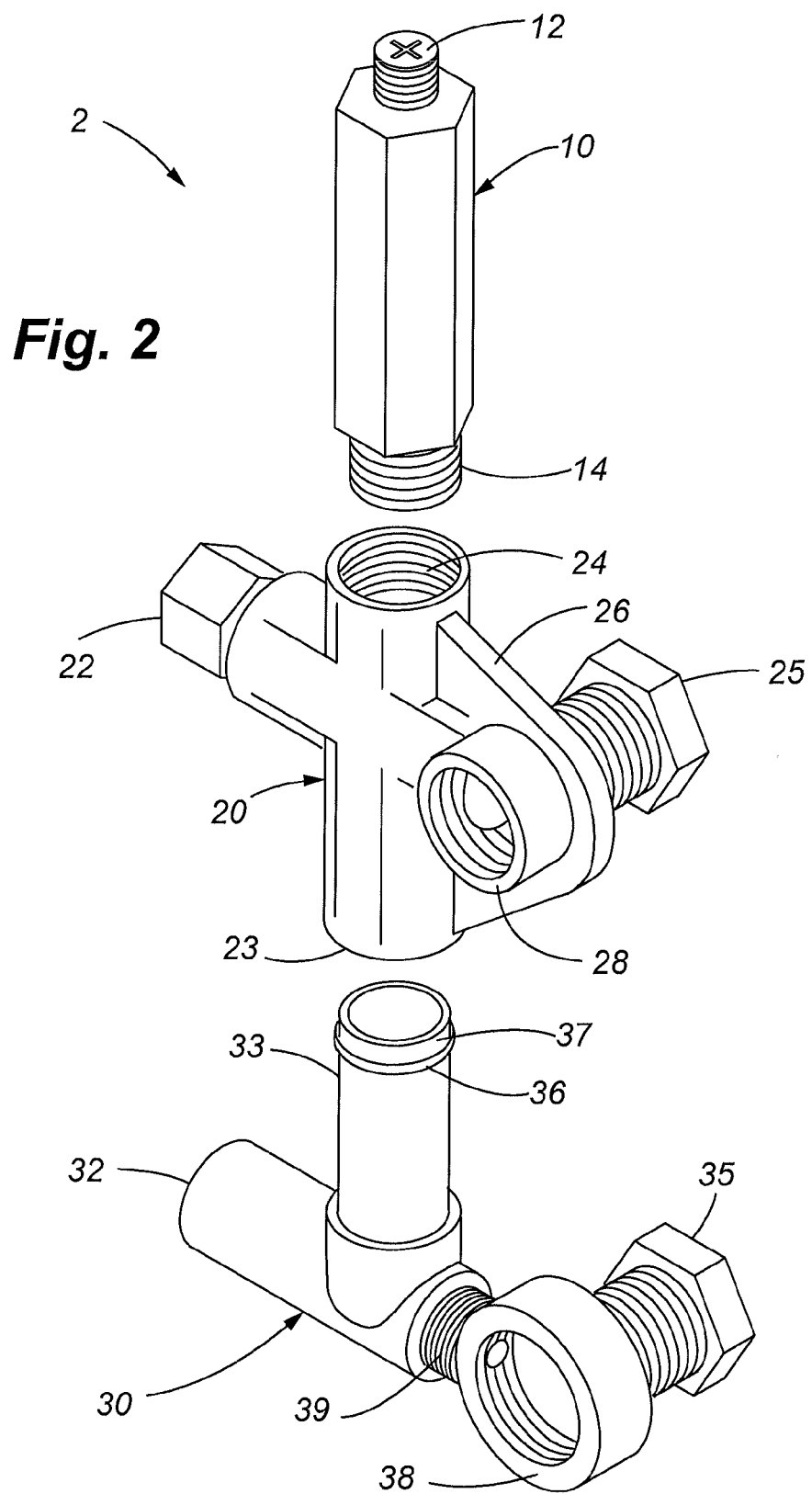
FIG. 2 is a partially exploded perspective view of the unloader valve, according to one embodiment of the invention.

Referring now to FIG. 2, an unloader valve assembly according to one embodiment of the disclosure is shown in a partially exploded perspective view. The unloader valve assembly 2 comprises a regulator assembly 10 coupled to a first coupling assembly 20, which is further coupled to a second coupling assembly 30. The regulator assembly 10 comprises an adjustment means 12 for adjusting the sensitivity of a regulator valve (not shown) located internally in the regulator assembly 10, and a threaded connection 14 for coupling the regulator assembly 10 to the first coupling assembly 20. In a preferred embodiment, adjustment means 12 is comprised of a threaded nut abutting a spring biased piston, such as the type shown in U.S. Pat. No. 3,834,413, but may be comprised of other adjustment means known in the art for regulating the sensitivity of regulator valves. The regulator valve (not shown) may take on a variety of forms, such as those referred to above in the Background of the Invention section, including but not limited to a spring biased regulator valve, a diaphragm type regulator valve, or any other valve for controlling and regulating variable pressure in a valve or pump assembly currently known in the art or developed in the future.

Still referring to FIG. 2, the first coupling assembly 20 is coupled to the regulator assembly 10 by means of the threaded connection 14 of the regulator assembly 10 being threadably inserted into the first threaded opening 24 of the first coupling assembly 20. The first coupling assembly 20 further comprises a second threaded opening 22 for allowing fluid regulated by the unloader valve assembly 2 to selectively exit the first coupling assembly 20, the process of operation being described in detail below.

The first coupling assembly 20 further comprises a shoulder 26, which includes a first coupling 28 for coupling to a pump, such as a high pressure pump or similar equipment associated with pumping applications. This first coupling 28 is in a fixed position relative to the unloader valve assembly 2 and first coupling assembly 20. According to a preferred embodiment, first coupling 28 comprises an opening, as shown in FIG. 2, on one side of the shoulder 26, and a bolt 25 on the other side of the shoulder for directing fluid from the first opening 28 to the unloader valve (not shown). According to this embodiment, the location of the bolt 25 is preferably a "banjo" bolt, which may be adjusted from one side of the shoulder to the opposite side, thereby permitting the first coupling 28 to be positioned on either side of the unloader valve assembly 2. Finally, first coupling assembly 20 further comprises an opening 23 for coupling with the second coupling assembly 30, as described in the following paragraph.

The second coupling assembly 30 comprises a connection means 33, which is dimensioned to be inserted into opening 23 of the first coupling assembly 20, thereby completing the unloader valve assembly 2. Connection means 33, according to a preferred embodiment, is generally a hollow cylinder, which is smooth along the outer circumference of the length of connection means 33, and further includes an O-ring 36 about one distal end adjacent to a flange 37. The flange 37 and adjacent O-ring 36 serve to retain second coupling assembly 30 to first coupling assembly 20 and prevent fluid flow except as through the hollow interior channel of connection means 33. As shown in FIG. 2, the interior diameter of opening 23 of first coupling assembly 20 is approximately the same as exterior diameter of the flange 37 of the connection means 33, and these diameters are further in relation to each other such that the connection means 33 and opening 23, once connected, attain a near frictionless fit. This arrangement further permits second coupling assembly 30 to move vertically from a first position to a second position and intermediate positions therebetween, as described in further detail in regard to FIGS. 3 and 4 below.

Second coupling assembly 30 further comprises a first threaded opening 32 for serving as an inlet to provide aspiration to the unloader valve assembly 2, or in other words provide the necessary vacuum pressure for regulating the pressure of the high pressure pump or other similar equipment associated with such applications when the valve is in an open position and expelling excess fluid received from the pump. Further description of the inlet and its operation in relation to the entire unloader valve assembly 2 is provided below. The second coupling assembly 30 further comprises a second coupling 38, which is attached to the second coupling assembly 30 by means of a threaded neck 39, which permits the second coupling 38 to translate in a generally horizontal direction (as shown in FIGS. 3 & 4) in relation to second coupling assembly 30. Similar to first coupling 28, one side preferably comprises an opening while the other side comprises a bolt 35, preferably a "banjo" bolt.

Generally, the second coupling 38 is provided to couple with the inlet of a high pressure pump or other similar equipment associated with such applications at a second location relative to the first coupling 28. The location of second coupling 38 relative to first coupling 28 may be achieved about two distinct and independent axes, and in a preferred embodiment these two axes are generally horizontal and vertical axes. More particularly, the second coupling 38 may be adjusted with respect to the major or longitudinal axis of the unloader valve assembly 2, and with respect to the minor or transverse axis of the unloader valve assembly 2. This is achieved by the adjustment of connection means 33 in relation to first coupling assembly 20, and further by the adjustment of second coupling 38 in relation to the second coupling assembly 30. Adjustment of connection means 33 is achieved by the generally smooth, cylindrical body being inserted in to the opening 23 of the first coupling assembly 20, which is capable of positioning in multiple locations between and including a first position (as shown in FIG. 3) and a second position (as shown in FIG. 4). Similarly, adjustment of second coupling is accomplished by the threaded neck 39 of second coupling 38, which allows either more or less of the length of threaded neck 39 to be exposed from the interior of second coupling assembly 30, ranging between a first position (as shown in FIG. 3) and a second position (as shown in FIG. 4).

Therefore, in operation the unloader valve assembly according to a preferred embodiment is described that comprises an unloader valve for regulating pressure within the unloader valve assembly 2 and any pump or other such piece of equipment associated with the unloader valve assembly 2, and that further comprises at least one first coupling, proximate to a central portion of the valve assembly, and at least one second coupling, proximate to a lower portion of the valve assembly. According to a preferred embodiment, the second coupling is adjustable in location with respect to the first coupling in at least two directions or axes. The unloader valve assembly 2 further comprises at least one outlet for expelling excess fluid from the valve assembly, and at least one inlet for aspirating the valve assembly, which are selectively in use depending on the position of the unloader valve (in either an open or a closed state). The first coupling is designed to be operatively associated with an outlet of a pump and the second coupling is designed to be operatively associated with an inlet of a pump. When the unloader valve is inactive, fluid is permitted to communicate between the outlet of the pump to the first coupling of the valve assembly, then continuing on to the second coupling of the valve assembly, and then to the inlet of the pump. When the unloader valve is active, fluid is also permitted to communicate between the valve assembly and the at least one outlet for expelling excess fluid from the valve assembly.

Referring now to FIG. 3, a partial sectional view of the unloader valve according to one preferred embodiment is shown, with the first and second couplings in a first position. As shown in FIG. 3, first coupling 28 is in a fixed position, with second coupling 38 in a first location spaced apart from first coupling 28 about one axis by dimension $X_1$ and another independent axis by dimension $Y_1$. This position is achieved by inserting connection means 33 in opening 23 so that dimension $V_1$ remains between the distal end of connection means 33 and the terminus of the channel formed by opening 23, as shown in FIG. 3, and further inserting threaded neck 39 into second coupling assembly 30 so that dimension $H_1$ of threaded neck 39 remains exposed outside of second coupling assembly 30. As $V_1$ increases in dimension, so does $Y_1$. As $H_1$ increases in dimension, so does XI. In this fashion, the location of second coupling 38 relative to first coupling 28 may be adjusted to accommodate a variety of different size pumps and the fittings for those pumps.

Referring now to FIG. 4, a partial sectional view of the unloader valve according to one preferred embodiment is shown, wherein the first and second couplings are in a second position. This second position of second coupling 38 corresponds to a dimension $X_2$ about a first axis and dimension $Y_2$ about a second axis. Similarly, $H_2$ and $V_2$ have correspondingly been adjusted to accomplish this second location. Intermediate positions between the second location as shown in FIG. 4 and the first location as shown in FIG. 3 may also be accomplished by varying the dimensions $H_2$ and $V_2$.

According to a preferred embodiment, the unloader valve assembly permits adjustment to the location of the second coupling 38 relative to the first coupling 28 such that $X_1$ ranges from about 4.5 mm to about 25 mm, and $Y_1$ ranges from about 54 mm to about 66 mm. According to alternate embodiments these dimensions may be smaller or larger depending on the size of the pumps the unloader valve assembly is designed to accommodate.

Referring now in general to FIGS. 2-4, there is fluid communication between first coupling 28 of the first coupling assembly 20 and the second coupling 38 of the second coupling assembly 30 when the unloader valve (not shown) of the regulator assembly 10 is in a closed position, thereby allowing fluid to circulate unimpeded between the inlet and, outlet of the associated pump or other such similar device. However, when the unloader valve (not shown) is in an open position, there is fluid communication as described above, but also fluid communication between the first coupling 28 of the first coupling assembly 20 and second threaded opening 22, thereby permitting excess fluid to be expelled from the unloader valve assembly 2 when the pressure in the unloader valve triggers the unloader valve to open. As discussed above, the unloader valve is most preferably a "trapped pressure" type valve, which is activated by building pressure within the valve assembly. Alternatively, the unloader valve may be a "flow actuated" valve, which is activated by an increase or decrease in fluid flow.

According to varying embodiments disclosed herein, the unloader valve assembly is designed to accommodate flow rates of about 2-6 gallons per minute (gpm), and about 1000-4000 pounds per square inch (psi) of pressure. The sensitivity of the trigger in the unloader valve of the unloader valve assembly may be anywhere within these ranges, depending on the style of unloader valve employed (flow rate or pressure type) and the user preferences. Thus, given these properties and the ability of the unloader valve assembly of the present disclosure to adjust to a wide variety of locations for the first and second couplings, the unloader valve assembly may be operatively associated with a wide variety of pumps, including small, medium and large frame pumps, and both low and high pressure pumps.

The foregoing description of the present disclosure has been presented for illustration and description purposes. However, the description is not intended to limit the invention to only the forms disclosed herein. In the foregoing Detailed Description for example, various features are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such a manner, or include other embodiments with various modifications as required by the particular application(s) or use(s) of the present invention. Thus, it is intended that the claims be construed to include alternative embodiments to the extent permitted by the prior art.

What is claimed is:

1. A valve assembly for relieving pressure in a pump, comprising:
    an unloader valve proximate to an upper portion of said valve assembly;
    a first coupling proximate to a central portion of said valve assembly;
    a second coupling proximate to a lower portion of said valve assembly, said second coupling adjustable in location with respect to said first coupling in at least two directions, wherein said second coupling is adjustable in location with respect to said first coupling by a first adjustable fitting and a second adjustable fitting, said first adjustable fitting comprising a slip ring connection between said lower portion and said central portion of said valve assembly, and said second adjustable fitting comprising a threaded screw connection between said second coupling and said lower portion of said valve assembly;
    at least one outlet for expelling excess fluid from said valve assembly and at least one inlet for aspirating said valve assembly;
    wherein said first coupling is designed to be operatively associated with an outlet of said pump and said second coupling is designed to be operatively associated with an inlet or bypass of said pump; and
    wherein when said unloader valve is inactive, fluid is permitted to communicate between said outlet of said pump to said first coupling of said valve assembly to said second coupling of said valve assembly to said inlet or bypass of said pump, and wherein when said unloader valve is active, fluid is also permitted to communicate between said valve assembly and said at least one outlet for expelling excess fluid from said valve assembly.

2. The valve assembly as claimed in claim 1, wherein said valve assembly is designed to operate within about 1000-6000 psi.

3. The valve assembly as claimed in claim 1, wherein said valve assembly is designed to permit about 2-6 gpm.

4. The valve assembly as claimed in claim 1, wherein said valve assembly is designed to be operatively associated with pumps ranging from small, medium, and large frame pumps.

5. The valve assembly as claimed in claim 1, wherein said valve assembly is further comprised of at least one means for adjusting the sensitivity of said unloader valve.

6. A valve assembly for relieving pressure in a pump, comprising:
    an unloader valve proximate to an upper portion of said valve assembly;
    a first coupling proximate to a central portion of said valve assembly;
    a second coupling proximate to a lower portion of said valve assembly, said second coupling adjustable in location with respect to said first coupling in at least two directions, wherein said second coupling is adjustable in location with respect to said first coupling by a first adjustable fitting and a second adjustable fitting, said first adjustable fitting comprising a slip ring connection between said lower portion and said central portion of said valve assembly, and said second adjustable fitting comprising a slip ring connection between said second coupling and said lower portion of said valve assembly;
    at least one outlet for expelling excess fluid from said valve assembly and at least one inlet for aspirating said valve assembly;
    wherein said first coupling is designed to be operatively associated with an outlet of said pump and said second coupling is designed to be operatively associated with an inlet or bypass of said pump; and
    wherein when said unloader valve is inactive, fluid is permitted to communicate between said outlet of said pump to said first coupling of said valve assembly to said second coupling of said valve assembly to said inlet or bypass of said pump, and wherein when said unloader valve is active, fluid is also permitted to communicate between said valve assembly and said at least one outlet for expelling excess fluid from said valve assembly.

7. The valve assembly as claimed in claim 6, wherein said valve assembly is designed to operate within about 1000-6000 psi.

8. The valve assembly as claimed in claim 6, wherein said valve assembly is designed to permit about 2-6 gpm.

9. The valve assembly as claimed in claim 6, wherein said valve assembly is designed to be operatively associated with pumps ranging from small, medium, and large frame pumps.

10. The valve assembly as claimed in claim 6, wherein said valve assembly is further comprised of at least one means for adjusting the sensitivity of said unloader valve.

11. A valve assembly for relieving pressure in a pump, comprising:
    an unloader valve proximate to an upper portion of said valve assembly;
    a first coupling proximate to a central portion of said valve assembly;
    a second coupling proximate to a lower portion of said valve assembly, said second coupling adjustable in location with respect to said first coupling in at least two directions, wherein said second coupling is adjustable in location with respect to said first coupling by a first adjustable fitting and a second adjustable fitting, said first adjustable fitting comprising a threaded screw connection between said lower portion and said central portion of said valve assembly, and said second adjustable fitting comprising a threaded screw connection between said second coupling and said lower portion of said valve assembly;

at least one outlet for expelling excess fluid from said valve assembly and at least one inlet for aspirating said valve assembly, wherein said first coupling is designed to be operatively associated with an outlet of said pump and said second coupling is designed to be operatively associated with an inlet or bypass of said pump; and wherein when said unloader valve is inactive, fluid is permitted to communicate between said outlet of said pump to said first coupling of said valve assembly to said second coupling of said valve assembly to said inlet or bypass of said pump, and wherein when said unloader valve is active, fluid is also permitted to communicate between said valve assembly and said at least one outlet for expelling excess fluid from said valve assembly.

12. The valve assembly as claimed in claim 11, wherein said valve assembly is designed to operate within about 1000-6000 psi.

13. The valve assembly as claimed in claim 11, wherein said valve assembly is designed to permit about 2-6 gpm.

14. The valve assembly as claimed in claim 11, wherein said valve assembly is designed to be operatively associated with pumps ranging from small, medium, and large frame pumps.

15. The valve assembly as claimed in claim 11, wherein said valve assembly is further comprised of at least one means for adjusting the sensitivity of said unloader valve.

16. A valve assembly for relieving pressure in a pump, comprising:

an unloader valve proximate to an upper portion of said valve assembly;

a first coupling proximate to a central portion of said valve assembly;

a second coupling proximate to a lower portion of said valve assembly, said second coupling adjustable in location with respect to said first coupling in at least two directions, wherein said second coupling is adjustable in location with respect to said first coupling by a first adjustable fitting and a second adjustable fitting, said first adjustable fitting comprising a threaded screw connection between said lower portion and said central portion of said valve assembly, and said second adjustable fitting comprising a slip ring connection between said second coupling and said lower portion of said valve assembly;

at least one outlet for expelling excess fluid from said valve assembly and at least one inlet for aspirating said valve assembly;

wherein said first coupling is designed to be operatively associated with an outlet of said pump and said second coupling is designed to be operatively associated with an inlet or bypass of said pump; and wherein when said unloader valve is inactive, fluid is permitted to communicate between said outlet of said pump to said first coupling of said valve assembly to said second coupling of said valve assembly to said inlet or bypass of said pump, and wherein when said unloader valve is active, fluid is also permitted to communicate between said valve assembly and said at least one outlet for expelling excess fluid from said valve assembly.

17. The valve assembly as claimed in claim 16, wherein said valve assembly is designed to operate within about 1000-6000 psi.

18. The valve assembly as claimed in claim 16, wherein said valve assembly is designed to permit about 2-6 gpm.

19. The valve assembly as claimed in claim 16, wherein said valve assembly is designed to be operatively associated with pumps ranging from small, medium, and large frame pumps.

20. The valve assembly as claimed in claim 16, wherein said valve assembly is further comprised of at least one means for adjusting the sensitivity of said unloader valve.

* * * * *